US012205185B2

(12) United States Patent
Brooks

(10) Patent No.: US 12,205,185 B2
(45) Date of Patent: Jan. 21, 2025

(54) SYSTEMS AND METHODS OF A TRANSITION AND NOTIFICATION PROTOCOL

(71) Applicant: PREORDAIN LLC, Los Angeles, CA (US)

(72) Inventor: Michael Brooks, Los Angeles, CA (US)

(73) Assignee: Preordain LLC, Los Angeles, CA (US)

( * ) Notice: Subject to any disclaimer, the term of this patent is extended or adjusted under 35 U.S.C. 154(b) by 486 days.

(21) Appl. No.: 17/383,933

(22) Filed: Jul. 23, 2021

(65) Prior Publication Data

US 2022/0028018 A1   Jan. 27, 2022

Related U.S. Application Data

(60) Provisional application No. 63/055,790, filed on Jul. 23, 2020.

(51) Int. Cl.
  *G06Q 50/18*   (2012.01)
  *G06F 21/60*   (2013.01)
  *G06F 21/62*   (2013.01)
  *G08B 21/04*   (2006.01)

(52) U.S. Cl.
  CPC ......... *G06Q 50/186* (2013.01); *G06F 21/604* (2013.01); *G06F 21/6245* (2013.01); *G08B 21/0415* (2013.01)

(58) Field of Classification Search
  None
  See application file for complete search history.

(56) References Cited

U.S. PATENT DOCUMENTS

| 11,037,231 | B1 * | 6/2021 | Barakat ................... G06F 21/45 |
| 2006/0111092 | A1 | 5/2006 | Harris et al. |
| 2012/0282887 | A1 | 11/2012 | Khoo et al. |
| 2014/0051485 | A1 | 2/2014 | Wang et al. |

(Continued)

FOREIGN PATENT DOCUMENTS

WO   WO-2016162806 A2 *  10/2016  ............. G06Q 10/10

OTHER PUBLICATIONS

International Search Report and Written Opinion for PCT/US2021/042936, mailed Nov. 4, 2021.

(Continued)

*Primary Examiner* — Jan P Mincarelli
(74) *Attorney, Agent, or Firm* — Command IP LLP; Pejman Yedidsion

(57) ABSTRACT

Systems, devices, and methods including a computing device with a processor configured to: send a keep-alive signal to a user at a predefined interval; determine an active status of the user if a reply to the keep-alive signal is received prior to an expiration of the predefined interval; determine a non-active status of the user if a reply to the keep-alive signal is not received prior to an expiration of the predefined interval; send a first level transition notification to a first contact list if the determined status of the user is non-active; send a second level transition notification to a second contact list after a first time period has expired and the reply to the keep-alive signal is not received; and send a third level transition notification to a third contact list after a second time period has expired and the reply to the keep-alive signal is not received.

18 Claims, 9 Drawing Sheets

(56) References Cited

U.S. PATENT DOCUMENTS

| | | |
|---|---|---|
| 2014/0052342 A1 | 2/2014 | Seibert |
| 2015/0138948 A1 | 5/2015 | Cai |
| 2015/0254794 A1* | 9/2015 | Levin ................... G06Q 50/186 |
| | | 705/312 |
| 2017/0103230 A1* | 4/2017 | O'Brien ................. G06Q 10/10 |
| 2017/0132736 A1* | 5/2017 | Switzer, Sr. ......... G06Q 50/186 |
| 2018/0053273 A1* | 2/2018 | Beal .................... G06F 21/6209 |

OTHER PUBLICATIONS

The Hivemq Team. "Last Will and Testament—MQTT Essentials: Part 9." Mar. 9, 2015 (Mar. 9, 2015) Retreived on Sep. 27, 2021 (Sep. 27, 2021) from entire document.

* cited by examiner

SYSTEMS AND METHODS OF A TRANSITION AND NOTIFICATION PROTOCOL

CROSS-REFERENCE TO RELATED APPLICATIONS

This application claims priority to and the benefit of U.S. Provisional Patent Application No. 63/055,790, filed Jul. 23, 2020, the contents of which are hereby incorporated by reference herein for all purposes.

TECHNICAL FIELD

Embodiments relate generally to estate planning, and more particularly to a transition and notification protocol system for a customizable estate plan.

BACKGROUND

Estate plan organizing may include gathering, organizing, and outlining an entire estate plan. The estate plan may include insurance policies, existence of trusts or wills, and contact information for relatives, clergy, and professionals that may need to be contacted and potentially engaged in the event of an emergency. These professionals may include physicians, attorneys, accountants, bankers, insurance brokers, real estate brokers, property managers, money managers, and business partners. Estate plan organizing may also include storage of important security information, such as cloud computing passwords, subscriptions, stocks, bonds, location and existence of assets, descriptions of contents in and locations of safe deposit boxes, and the like. This security information may be stored in including offsite or online storage services such as Google Drive of Alphabet Inc., Mountain View, California; Dropbox of Dropbox, Inc. of San Francisco, California; and others.

SUMMARY

A system embodiment may include a computer implemented method comprising executing, on a processor with addressable memory, the steps of receiving, by a database controller that configures the processor, a user data from at least one remote server. In one embodiment an application controller may prompt a user with at least one modules corresponding to different aspects of the user's estate. In one embodiment, each module may have a different set of questions for the user to fill out based on documents associated with that module.

In one embodiment, a module controller may receive the user-provided data and perform a gap analysis with the module controller on the documents of each module to search for any missing information or "gaps" in the document. A keep-alive controller may transmit a notification to the user to check on the user's current status. The keep-alive controller may transmit the notification to at least one preferred list of contacts of the user in the event that the user has not promptly and/or properly responded to the notification. In one embodiment, a database controller may receive user data and load the user data into a database program.

A system embodiment may include: a computing device with a processor, the processor configured to: send a keep-alive signal to a user at a predefined interval; determine an active status of the user if a reply to the keep-alive signal is received prior to an expiration of the predefined interval; determine a non-active status of the user if a reply to the keep-alive signal is not received prior to an expiration of the predefined interval; send a first level transition notification to a first contact list of the user if the determined status of the user is non-active; send a second level transition notification to a second contact list of the user after a first time period has expired and the reply to the keep-alive signal is not received; and send a third level transition notification to a third contact list of the user after a second time period has expired and the reply to the keep-alive signal is not received.

In additional system embodiments, the first contact list has more access to the user information than the second contact list. In additional system embodiments, the second contact list has more access to the user information than the third contact list. In additional system embodiments, the first contact list comprises more members than the second contact list. In additional system embodiments, the second contact list comprises more members than the third contact list. In additional system embodiments, the first contact list comprises fewer members than the second contact list. In additional system embodiments, the second contact list comprises fewer members than the third contact list.

In additional system embodiments, the first level transition notification further comprises: one or more copies of a will or trust; do not resuscitate forms; an asset list; and burial instructions and preferences. In additional system embodiments, the second level transition notification further comprises: a death certificate; a designated contact's identification (ID); and one or more notarized paperwork. In additional system embodiments, the third level transition notification further comprises: one or more digital account passwords; and banking information.

A method embodiment may include: sending a keep-alive signal to a user at a predefined interval; determining an active status of the user if a reply to the keep-alive signal is received prior to an expiration of the predefined interval; determining a non-active status of the user if a reply to the keep-alive signal is not received prior to an expiration of the predefined interval;

sending a first level transition notification to a first contact list of the user if the determined status of the user is non-active; sending a second level transition notification to a second contact list of the user after a first time period has expired and the reply to the keep-alive signal is not received; and sending a third level transition notification to a third contact list of the user after a second time period has expired and the reply to the keep-alive signal is not received.

In additional method embodiments, the first contact list comprises fewer members than the second contact list. In additional method embodiments, the second contact list comprises fewer members than the third contact list. In additional method embodiments, the first contact list comprises more members than the second contact list. In additional method embodiments, the second contact list comprises more members than the third contact list.

In additional method embodiments, the first level transition notification further comprises: one or more copies of a will or trust; do not resuscitate forms; an asset list; and one or more burial instructions and preferences. In additional method embodiments, the second level transition notification further comprises: a death certificate; a designated contact's identification (ID); and one or more notarized paperwork. In additional method embodiments, one or more digital account passwords; and banking information.

In additional method embodiments, the first contact list has more access to the user information than the second contact list. In additional method embodiments, the second contact list has more access to the user information than the third contact list.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

Figure 1:
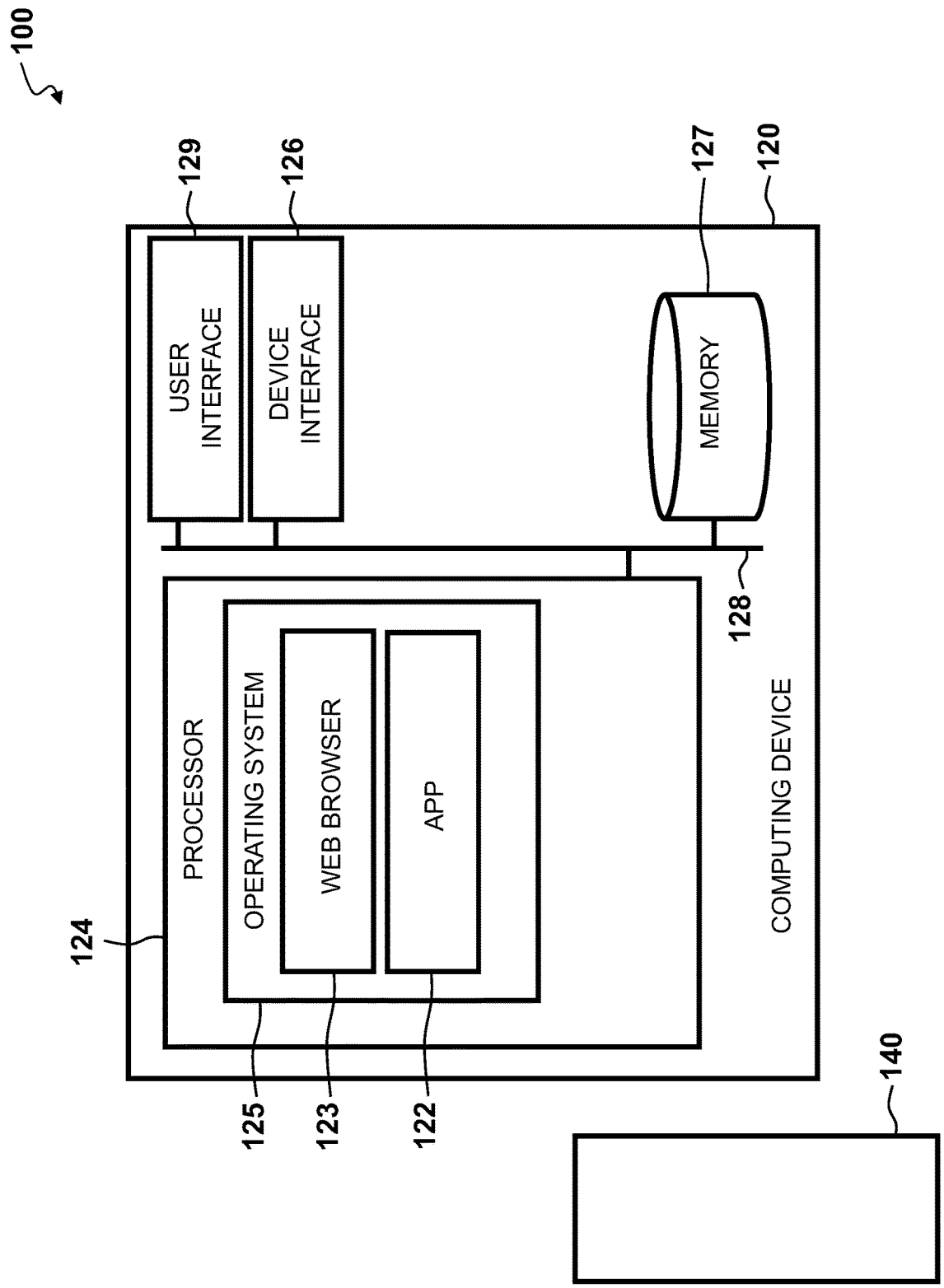
FIG. 1 illustrates an example top-level functional block diagram of a computing device embodiment.

The described technology concerns one or more methods, systems, apparatuses, and mediums storing processor-executable process steps to gather, outline, and organize an estate plan for a user. Additional embodiments include one or more methods, systems, apparatuses, and mediums storing processor-executable process steps to customize a transition and notification protocol for the user.

The techniques introduced below may be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

FIGS. 1-9 and the following discussion provide a brief, general description of a suitable computing environment in which aspects of the described technology may be implemented. Although not required, aspects of the technology may be described herein in the general context of computer-executable instructions, such as routines executed by a general- or special-purpose data processing device (e.g., a server or client computer). Aspects of the technology described herein may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer-implemented instructions, data structures, screen displays, and other data related to the technology may be distributed over the Internet or over other networks (including wireless networks) on a propagated signal on a propagation medium (e.g., an electromagnetic wave, a sound wave, etc.) over a period of time. In some implementations, the data may be provided on any analog or digital network (e.g., packet-switched, circuit-switched, or other scheme).

In one embodiment, the present system and method provides a methodology of notifying an end of life or incapacity of a user. For example, the present system and method may generate a notification indicating that a user may have dementia or any other incapacitating health issue. In another example, the present system and method may generate a notification to notify a determined set of contacts that a user is incarcerated and/or incapacitated.

In one embodiment, the present system and method provides a third-party authentication of authentication information. For example, the type of authentication information may be categorized into three conceptual categories: "something a user has", "something a user knows", and "something a user is". The present system and method could provide a third-party authentication of up to all three conceptual categories of authentication information before providing data to an individual. In another example, the present systems and methods provide a third-party authentication of "something a user has" by authenticating a code sent to a user. In another example, the present systems and methods provide a third-party authentication of "something a user knows" by providing a password prompt. In another example, the present systems and methods provide a third-party authentication of "something a user is" by using facial recognition technology. In another example, the present systems and methods third party authentication through a mobile application.

FIG. 1 illustrates an example of a top-level functional block diagram of a computing system embodiment 100. The example operating environment is shown with a server computer 140 and a computing device 120 comprising a processor 124, such as a central processing unit (CPU), addressable memory 127, an external device interface 126, e.g., an optional universal serial bus port and related processing, and/or an Ethernet port and related processing, and an optional user interface 129, e.g., an array of status lights and one or more toggle switches, and/or a display, and/or a keyboard and/or a pointer-mouse system and/or a touch screen. Optionally, the addressable memory may include any type of computer-readable media that can store data accessible by the computing device 120, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network, such as a LAN, WAN, or the Internet. These elements may be in communication with one another via a data bus 128. In some embodiments, via an operating system 125 such as one supporting a web browser 123 and applications 122, the processor 124 may be configured to execute steps of a process establishing a communication channel and processing according to the embodiments described above.

In one embodiment, the processor 124 may execute steps to gather, outline, and organize an estate plan for a user. The estate plan may include, but is not limited to, insurance policies, existence of trusts or wills, relatives contact information and clergy as well as professionals that need to be contacted and potentially engaged in the event of an emergency such as physicians, attorneys, accountants, bankers, insurance brokers, real estate brokers, property managers, money managers, clergy and business partners. For example, the application 122 may prompt the user with a series of questions related to the planning of the user's estate. In one embodiment, the user will input the information and answer the questions to provide a current state and summary document (or documents) of the user's current estate and portfolio. In another embodiment, an agent of the user may be prompted with the questions to fill out on behalf, and under the advisement of, the user.

In one embodiment, the summary document may be analyzed by the processor 124 to identify any missing information or "gaps" in the document. Additionally, the application 122 may provide the user with a plan or "roadmap" to help the user identify opportunity areas and engage the appropriate professionals (e.g., attorneys, accountants, insurance agents) to fill in said gaps. In one embodiment, the application 122 may generate the plan by defining a dynamic target state for the user's estate plan based on the user's list of assets and goals. In one embodiment, the user's list of assets and goals may be self-reported. In one embodiment, recommendations and referrals may be provided to estate professionals, such as attorneys, accountants, etc. that may advise and assist the user.

A Personal Estate Plan (PEP) document may be created which may include attachments and links to all pertinent documents, such as wills, trusts, and the like. In one embodiment, the user may continually add information over time to the document; therefore, the PEP may be a dynamic and "living" document, including letters to heirs, burial wishes, Do Not Resuscitate (DNR) documents, etc. As described above, the document may include a list of current professionals that may be contacted by the heirs for assistance, such as attorneys, bankers, accountants, realtors, stockbrokers, clergy, money managers, and insurance agents or companies.

In one embodiment, barcode strips may be sent to a user, such as through the physical mail or electronically. Each barcode strip may be associated with a particular document, such as a power of attorney document, a next of kin document, and the like. The user may attach the barcode and/or a mailing sticker to the corresponding document that the user has filled out and the user may send the document back for filing, storing, and/or safe keeping. In one embodiment, each document is filed based on the scanned barcode.

In one embodiment, a label may be attached to the document identifying the type of document, e.g., a trust, will, etc. The document may further include a document ID number, a client number, and a designation for which "level" the document is to be assigned to. The levels will be described in further detail below. As the document gets scanned with the barcode, the document may then be filed and organized according to, at least, the document ID number, the client number, and the level designation.

Figure 2:
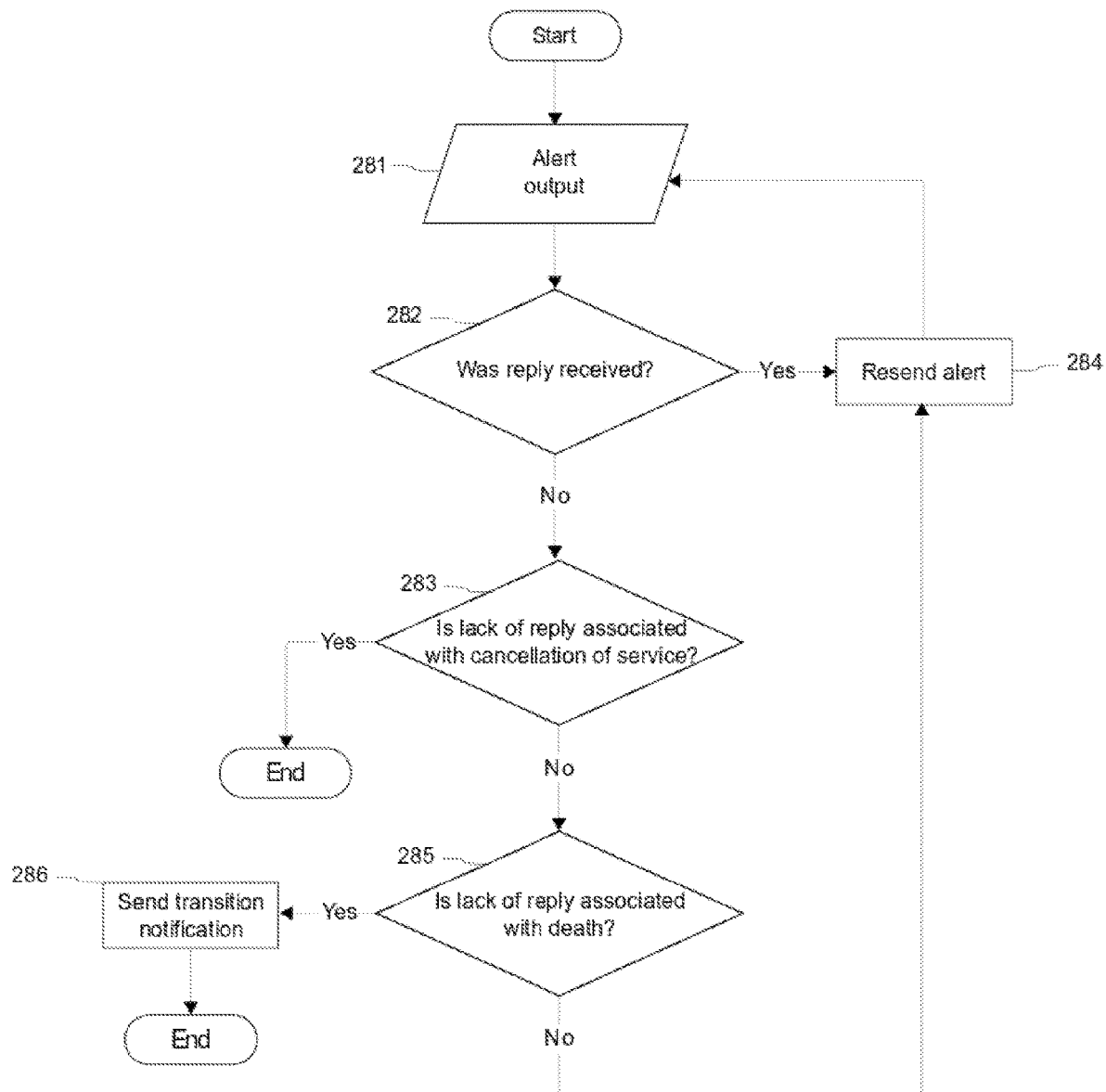
FIG. 2 is a flow chart showing how the status of an individual is determined.

Referring to FIG. 2, an alert analogous to a keep-alive signal may often be sent 281 by the system to a user at predefined intervals. The alert may be used by the processor 124 of FIG. 1 to determine 282 the status of a connection. If an alert is sent and a reply is given, the processor may determine that the connection is still up 282 and resend another alert 284 after a predefined interval. If an alert is sent and no reply is given 282, then the processor 124 of FIG. 1 may determine that the connection is down. The processor may further determine 283 whether a user wants to continue services based off the reply. If the processor does not receive a reply, the processor may determine that the user does not want to continue services. If the processor does receive a reply, the processor may determine that the user wants to continue services. The processor 124 may further use a lack of reply to determine 285 that the user has passed away. The processor may then send 286 a transition notification to a predefined contact list.

In one embodiment, the alert may be customized by the user, such that users may set up how they want to receive and respond to the notification. For example, the user may prefer an app on a mobile device with an alarm clock. That is, the alert may be executed locally on the user equipment of the user. In one embodiment a timer may be used to generate a reply to be sent, via the processor, to indicate that the connection is still up and the user is still active. According to this embodiment, the user is prompted based on an expiring timer on the local device to confirm their availability, thereby causing the user equipment to send messages to the computing device. In one embodiment, an alarm device may be utilized to send an alert. According to this embodiment, the alarm device may only be shut off with a provided key data. The alarm device may be configured to change how frequently the user receives a notification based on the user's preferences. The alarm device may also be configured to send a response in case the user cannot respond to the alert. In one embodiment, the notification sent to the user may be a phone call generated by an app.

Figure 3:
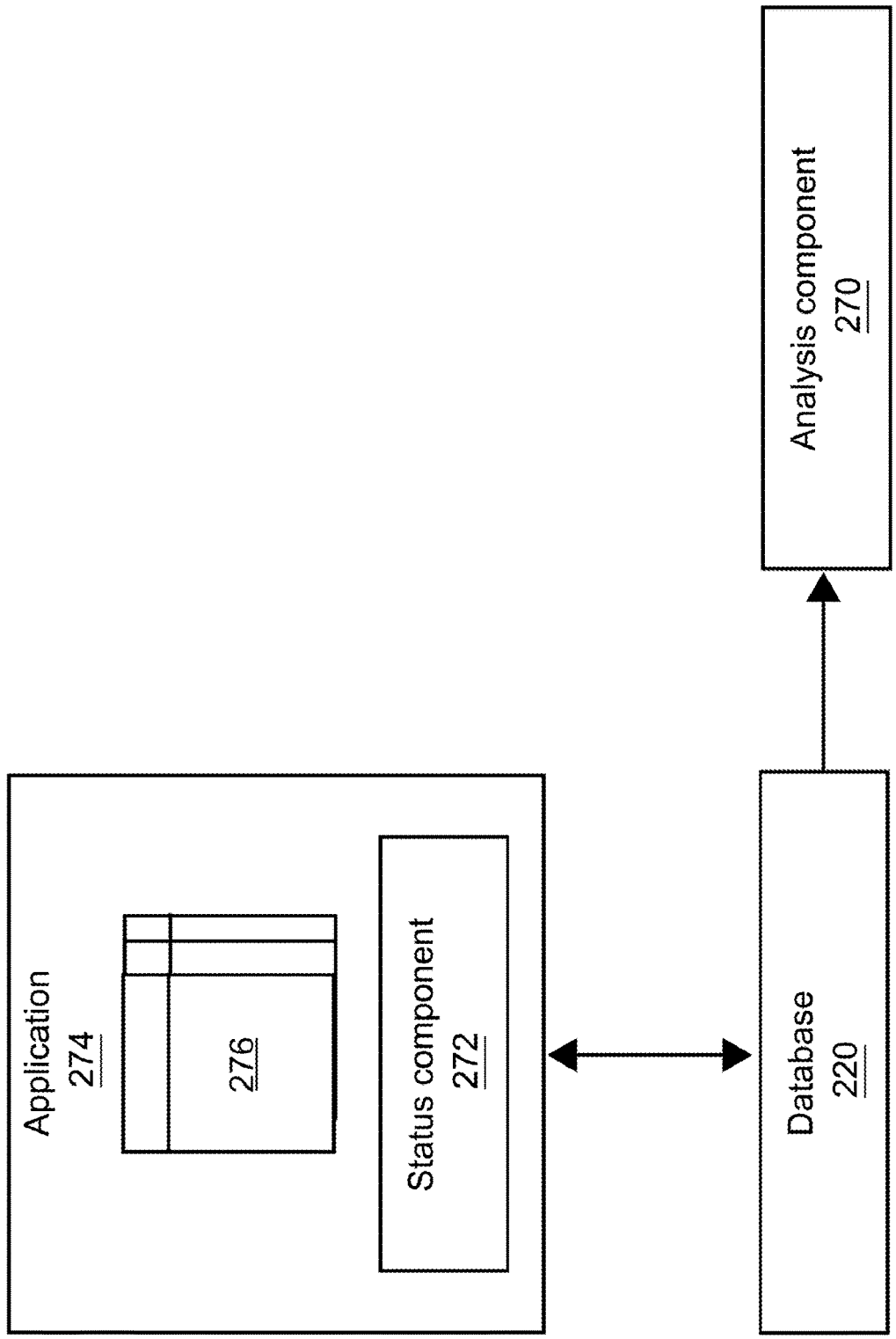
FIG. 3 is a block diagram depicting software components.

With respect to FIG. 3, a database 220 may be in communication with an application 274. The application may retrieve user data from the database. The user data may include answers to a series of questions related to the planning of the user's current estate and portfolio. In one embodiment, an application 274 may include a plurality of modules 276 corresponding to different aspects of the user's estate, such as distinct modules for insurance policies, trusts, wills, contact information of relatives and clergy, and so forth. Each module may have a different set of questions for the user to fill out based on the documents associated with that module. In one embodiment, the application 274 prompts the user with at least one module. The user may input the information for a given module at the user interface 129 to provide a current state and summary document (or documents) for the particular aspect of the module. In another embodiment, an agent of the user may be prompted with the questions to fill out on behalf, and under the advisement of, the user. The filled out information may be stored as user data in the database.

An analysis component 270 may receive the user-provided data via the database 220. In one embodiment, the analysis component 270 may analyze the user data for any missing information or inconsistencies. In the event that the analysis component 270 finds any issues, the analysis component 270 may alert the user of the issue and prompt them to correct the issue.

Figure 4:
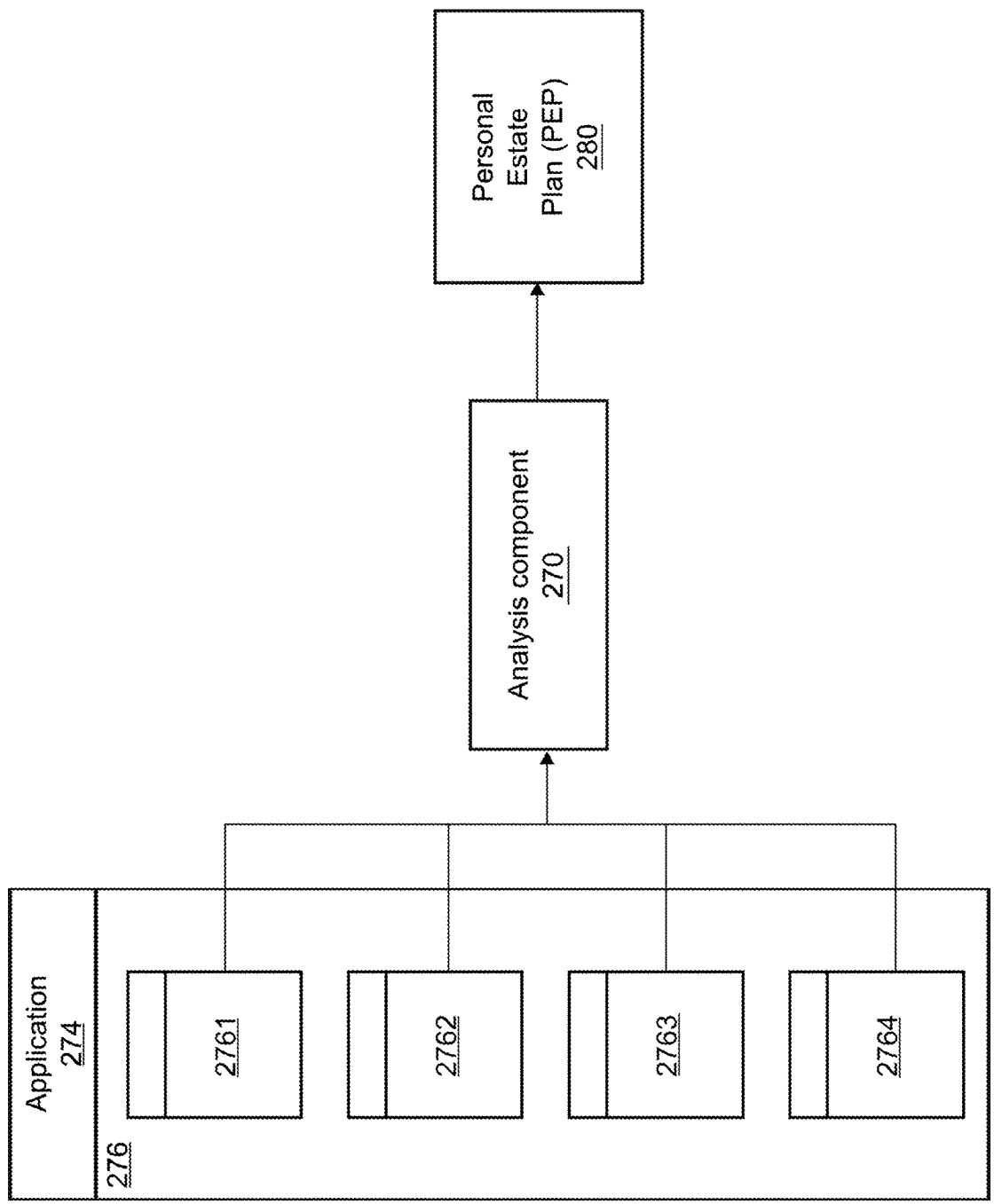
FIG. 4 is a block diagram depicting the generating of a Personal Estate Plan (PEP) document.

With respect to FIG. 4, in one embodiment, the analysis component 270 may generate a Personal Estate Plan (PEP) document 280 based off data gathered by the application 274. The application may send information gathered by plurality of modules 276, including information gathered by an insurance policy module 2761, a trust module 2762, a wills module 2763, and a contact information module 2764. In one embodiment, the PEP document may include attachments and links to all pertinent documents, such as will, trusts, and the like. In one embodiment, the user may continually add information over time to the document; therefore, the PEP document may include letters to heirs, burial wishes, Do Not Resuscitate (DNR) documents, etc. The PEP document may include a list of current professionals that may be contacted by the heirs for assistance, such as attorneys, bankers, accountants, realtors, stockbrokers, money managers, and insurance agents or companies.

In one embodiment, the analysis component may provide the user with a score based on the amount of missing information or inconsistencies in the user-provided data. In one embodiment, the score card is a numerically based system, such as 1-10, with 1 meaning the PEP is missing substantial information, and 10 meaning that no modules have any gaps. For example, a user may not have any inconsistencies except for a gap in the user's will. For instance, the user may have one or more real estate assets but have not added those assets to their will. The user may therefore have a slightly lower score, such as 9 out of 10.

Additionally, the user may be provided with a plan or "roadmap" to help the user identify opportunity areas and engage the appropriate professionals (e.g., attorneys, accountants, insurance agents) to fill in said gaps. In one embodiment, recommendations and referrals may be provided to estate professionals, such as attorneys, accountants, etc. that may advise and assist the user. For example, the user may have a full estate plan, but does not know who to engage: Who is the accountant? What attorneys should I reach out to?

In one embodiment, a status component 272 may be frequently notified to see if the user would like to add to or change any PEP-related documents. In one embodiment, the user may be frequently notified with a notification sent from the status component 272 to see if the user would like to update any of the user's modules, and, hence, the user's PEP document. The status component 272 notification may also be used to check on the user's current status, such as if they are in an emergency or have passed away.

In one embodiment, keep-alive signals may often be sent at predefined intervals. After a signal is sent, if no reply is received, the connection or link is assumed to be down or not available where future notifications or information (by way of data) may be routed via another path or to another person's user equipment designated by the user initially. A keep-alive signal may also be used to indicate that the connection should be preserved and that the user is still alive to the system and interested in either continuing their service or updating their files.

In one embodiment, the processor 124 may execute steps to notify successors of the user in the event that the user has passed away or has not responded to a notification. More specifically, the system 100 may include a user's customized preferred transition and notification protocol (TANP) in the event of an emergency. In one embodiment, the system 124 via the processor 124 of the computing device may employ a keep-alive (KA) protocol to ensure a persistent connection is still available with the user. In one embodiment, an HTTP persistent connection, also called HTTP keep-alive, or HTTP connection reuse, may be used where a single TCP connection sends and receives multiple HTTP requests/responses, or in another embodiment, opening a new connection for every single request/response pair. In yet another embodiment, a newer HTTP/2 protocol may be used to allow multiple concurrent requests/responses to be multiplexed over a single connection. For example, the server computing device may use this protocol to ensure all the users who have signed up for the server with the system are still providing a response and available (e.g., still alive). That is, a user may be frequently notified to see if the user would like to add to or change any PEP-related documents. The frequent notifications are also used to check in and monitor if the user has passed away or may be in an emergency situation in the event that the user has not responded.

In one embodiment, this keep-alive system may be customized by the user, such that users may set up how they want to receive and respond to the notification. For example, the user may prefer an app on a mobile device with an alarm clock. That is, the keep-alive system may be executed locally on the user equipment of the user and where a timer is used to generate a keep-alive message be sent to the server computing device to inform the server the user is still active. According to this embodiment, the user is prompted based on an expiring timer on the local device to confirm their active status and causing the user equipment to send messages to the server computing device.

In another embodiment, the user may prefer a proactive call-in system or call receiving system. In such embodiments, the server computing device places a phone call to the user and upon them picking up the call, confirms their active status or alternatively, requires the user to call a predetermined number on a regular schedule to ensure they are still connected to the system. In an embodiment utilizing phone calls, the system may incorporate voice recognition or facial recognition (if using a smartphone or tablet device). Other examples of notification types include biometric signatures, such as a finger print or facial recognition on a device, a voice signature, a keypad password entry, and so forth. The user may further customize the alert to be less or more frequent, or to require multiple notification types.

A transition notification may be triggered by the user's failure to properly respond to a keep-alive signal or ping or alert or if they have not entered the proper credentials. This notification may be transmitted to a preferred set of people designated by the user. In one embodiment, a first level transition notification may include private and urgent information to the designated user contacts. Examples of a first level TANP may be soft copies of a will or trust, DNR, asset list, burial instructions and preferences, such as the existence of a funeral plot, key clergy, a military funeral, etc. Notifications may be disseminated to the appropriate contacts by text message, email, automated voice, and the like.

In the scenario where the user is no longer available (e.g., no longer alive) the user's information may be disseminated once the contacts are verified and authenticated based on the user's wishes that were previously recorded. For example, first level information that may be urgently required (including but not limited to DNR, power of attorney, an attorney's contact information, wills, trusts, assets lists, contents of safe deposit boxes, and location of the keys for safe deposit boxes, primary physician's contact information, concierge medical staff, next of kin, burial instructions, and religious preferences) may be made immediately available either to the preferred list of contacts preselected by the user, or, in some cases, made available to someone authorized to request it, such as if a hospital administrator or doctor is calling for a DNR.

In one embodiment, a second level transition notification may include private, yet less urgent information than the first level information to the designated user contacts. Second level notifications may include documents which are identified by the user in advance, which may require additional protocols for dissemination including but not limited to a death certificate, the designated contact's ID, notarized paperwork, and in some cases a medallion signature guarantee from a bank. These documents may be available to any of the user's listed contacts with second level access. Based on the user's wishes, those on the contact list may be notified once the user's condition is known, and offer these documents based on verification and authentication. For example, the notification may alert the contact that list that the information the user asked to make available requires paperwork, such as paperwork attached in an email to the contact list that needs to be filled out before the information can be provided. In one embodiment, a second level transition notification may include power of attorney documents, wills, trusts, attorney and accounting contacts, etc. In one embodiment, authentication criteria may include how a user wants to designate how people on the list can be authenticated. In one embodiment, an authentication criterion may be a phone number of a person on the contact list already stored in the database. In another embodiment, a user may wish to have people on the contact list provide a DNA test to confirm the person's identity.

In one embodiment, a third level transition notification may include private, yet less urgent information than the first and second level information to the designated user contacts. In one embodiment, a third level notification may include, but not be limited to, descriptions of contents in safe deposit boxes, locations of safe deposit boxes, location of assets, letters to trustee, letters to heirs, passwords for banks, cloud computing accounts such as Google Photo or Gmail, and the like.

In one embodiment, the contact list may be different for each of the three levels. In another embodiment, the first level has the fewest and most immediate contacts. Each successive level may include additional contacts instead of or in addition to the first level contacts. As such, a user may create hierarchical access to documents, add a contact list with a given level of access, and help create authentication criteria for each level. In another embodiment, the first level has more contacts than each successive level. In one embodiment, there may be more than three levels. In another embodiment, additional levels, e.g., a level 4 may have a plurality of contacts but each contact only has 1 document or piece of information to receive, such that someone may write a letter to a number of heirs, and only that specific heir would be able to see the specific letter. In some embodiments, a first contact list may have more access to the user information than the second contact list. In some embodiments, the second contact list may have more access to the user information than the third contact list. In some embodiments, the first contact list may have more members than the second contact list. In some embodiments, the second contact list may have more members than the third contact list. In other embodiments, the first contact list may have fewer members than the second contact list. In other embodiments, the second contact list may have fewer members than the third contact list.

In one embodiment, personal sub-level transition notifications may compliment the first, second, and third level transition notifications by providing information to specific members on the contact list. The information provided by each personal sub-level transition notification may be configured so that only the receiving members can access the sent information. In some embodiments, each personal sub-level transition notification may be sent to only one member. For example, each member receiving a personal sub-level transition notification may be able to access a private virtual drive that only the specific receiving member can access. In another example, each member receiving a personal sub-level transition notification may access a personalized message that only the receiving member can access. In some embodiments, each personal sub-level transition notification may be sent to a number of members less than the number of members associated with the first, second, and third level transition notifications. In some embodiments, a member may receive both a first, second, or third level notification and a personal sub-level transition notification. In some embodiments, the total number of transition notifications may be greater than five. For example, there may be N+5 transition notifications where N is the number of contact inputs by a user. The N+5 transition notifications may include up to a fifth level transition notification and N personal sub-level transition notifications.

Figure 5:
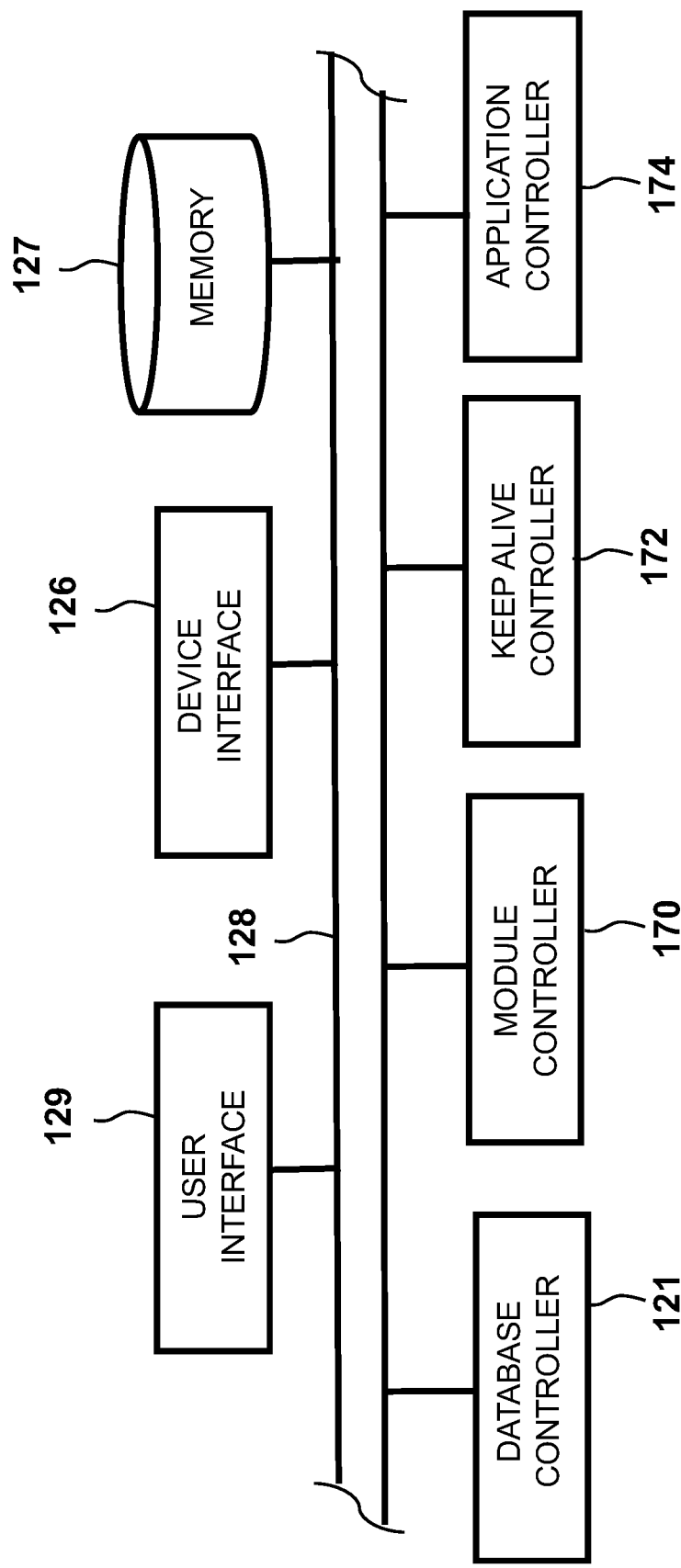
FIG. 5 depicts components in communication with a processor of the computing system of FIG. 1.

With respect to FIG. 5, components associated with or in communication with the processor 124 are shown. A database controller 121 may be in communication with the processor 124, for example, via the data bus 128. In one embodiment, the database controller 121 may receive user data from at least one database, such as a database associated with the server computer 140 in FIG. 1. The user data may include answers to a series of questions related to the planning of the user's current estate and portfolio. In one embodiment, an application controller 174 may include a plurality of modules corresponding to different aspects of the user's estate, such as distinct modules for insurance policies, trusts, wills, relatives contact information and clergy, and so forth. Each module may have a different set of questions for the user to fill out based on the documents associated with that module. In one embodiment, the application controller 174 prompts the user, at the user interface 129, with at least one module. The user may input the information for a given module at the user interface 129 to provide a current state and summary document (or documents) for the particular aspect of the module. In another embodiment, an agent of the user may be prompted with the questions to fill out on behalf, and under the advisement of, the user. In one embodiment, the user-provided data may be stored in the server computer 140.

A module controller 170 may receive the user-provided data via the database controller 121. In one embodiment, the module controller 170 may perform a gap analysis on the documents of each module to search for any missing information or "gaps" in the document. In the event that the module controller 170 finds a gap in the document (or documents) of a module, the user may be prompted at the user interface 129, such as with a text message, pop-up notification, and the like to enter the missing information.

In one embodiment, the module controller 170 may combine aspects of the modules to create a Personal Estate Plan (PEP) document. In one embodiment, the PEP document may include attachments and links to all pertinent documents, such as will, trusts, and the like. In one embodiment, the user may continually add information over time to the document; therefore, the PEP may be a dynamic and "living" document, including letters to heirs, burial wishes, Do Not Resuscitate (DNR) documents, etc. The PEP document may include a list of current professionals that may be contacted by the heirs for assistance, such as attorneys, bankers, accountants, realtors, stockbrokers, money managers, and insurance agents or companies.

In one embodiment, the user may be provided with a score based on the amount of missing information or gaps in the user-provided data. In one embodiment, the score card is a numerically based system, such as 1-10, with 1 meaning the PEP is missing substantial information, and 10 meaning that no modules have any gaps. For example, a user may not have any gaps in their modules, except for a gap in the module related to the user's will. For instance, the user may have a number of real estate assets but have not added those assets to their will. The user may therefore have a slightly lower score, such as 9 out of 10.

Additionally, the user may be provided with a plan or "roadmap" to help the user identify opportunity areas and engage the appropriate professionals (e.g., attorneys, accountants, insurance agents) to fill in said gaps. In one embodiment, recommendations and referrals may be provided to estate professionals, such as attorneys, accountants, etc. that may advise and assist the user. For example, the user may have a full estate plan, but does not know who to engage: Who is the accountant? What attorneys should I reach out to?

In one embodiment, a keep-alive controller 172 may be frequently notified to see if the user would like to add to or change any PEP-related documents. In another embodiment, the keep-alive controller 172 may periodically prompt the user to review and update data elements such as wills, trusts, amendments, contact lists, contingency plans, and the like. This way, the keep-alive controller can keep track of updates, and review and certify the most recent information. In one embodiment, the system may send the prompt to the user based on parsing through publicly available information such as change to ownership of a real property. In one embodiment, the user may be frequently notified with a notification sent from the keep-alive controller 172 to see if the user would like to update any of the user's modules, and, hence, the user's PEP document. The keep-alive controller 172 notification may also be used to check on the user's current status, such as if they are in an emergency or have passed away. More specifically, the frequent notifications may be used to check in and monitor if the user has passed away or may be in an emergency situation in the event that the user has not responded. In one embodiment, this keep-alive system may be customized by the user, such that users may set up how they want to receive and respond to the notification. For example, the user may prefer an app on a mobile device with an alarm clock. In another embodiment, the user may prefer a proactive call in system. Other examples of notification types and authentication include biometric signatures, such as a finger print or facial recognition on a device, a voice signature, a keypad password entry, and so forth. The user may further customize the alert to be less or more frequent, or to require multiple notification types. In one embodiment, the system may use wearable technology to determine if the user is no longer capable of responding and therefore initiate the process of notifying successors disclosed blow.

In one embodiment, the keep-alive controller 172 may notify successors of the user in the event that the user has passed away or has not responded to a notification or the system determined they have passed away by any other means, such as a wearable device or public obituary as parsed by the system. More specifically, keep-alive controller 172 may include a user's customized preferred transition and notification protocol (TANP) in the event of an emergency. In one embodiment, the transition notification may be triggered by the user's failure to properly respond to the keep-alive notification signal (or ping) or if they have not entered the proper credentials. This notification may be transmitted by the keep-alive controller 172 to a preferred set of people designated by the user. In one embodiment, a first level transition notification may include private and urgent information to the designated user contacts. Examples of a first level TANP may be soft copies of a will or trust, DNR, asset list, burial instructions and preferences, such as the existence of a funeral plot, key clergy, a military funeral, etc. Notifications may be disseminated to the appropriate contacts by text message, email, automated voice, and the like.

The user's information may be disseminated once the contacts are verified and authenticated based on the user's wishes that were previously recorded. For example, first level information that may be urgently required (including but not limited to DNR, power of attorney, an attorney's contact information, primary physician's contact information, concierge medical staff, next of kin, burial instructions, and religious preferences) may be made immediately available either to the preferred list of contacts preselected by the used, or, in some cases, made available to someone authorized to request it, such as if a hospital administrator or doctor is calling for a DNR.

In one embodiment, a second level transition notification may include transmitting by the computing device private, yet less urgent information than the first level information to the designated user contacts. Second level notifications may be transmitted if the first level transition data is confirmed to be completed and may include documents which are identified by the user in advance, which may require additional protocols for dissemination including but not limited to a death certificate, the designated contact's ID, notarized paperwork, and in some cases a medallion signature guarantee from a bank. These documents may be available to any of the user's listed contacts with second level access, where in some embodiments a user may be re-categorized as having a different level access should the computing system deem there to be a need for such a change, for example, a contingency plan that re-categorizes members of the user's listed contacts to higher or lower levels of access. In one specific example, a contingency plan may provide a predefined member such as a VIP or a successor with complete access upon the user's death. Based on the user's wishes, those on the contact list may be notified once the user's condition is known, and offer these documents based on verification and authentication. For example, the notification may alert the listed contact that the information the user asked to make available requires paperwork, such as paperwork attached in an email to the contact list that needs to be filled out before the information can be provided. In another example, the notification may alert the listed contact that they were requested or eligible to be given a different level of access.

In one embodiment, a third level transition notification may include private, yet less urgent information than the first and second level information to the designated user contacts.

In one embodiment, the contact list may be different for each of the three levels. In another embodiment, the first level has the fewest and most immediate contacts. Each successive level may include additional contacts instead of or in addition to the first level contacts. As such, a user may create hierarchical access to documents, add a contact list with a given level of access, and help create authentication criteria for each level. In one embodiment, authentication criteria may include how a user wants to designate how people on the list can be authenticated. In one embodiment, an authentication criterion may be a phone number of a person on the contact list already stored in the database. In another embodiment, a user may wish to have people on the contact list provide a DNA test to confirm the person's identity.

Figure 6:
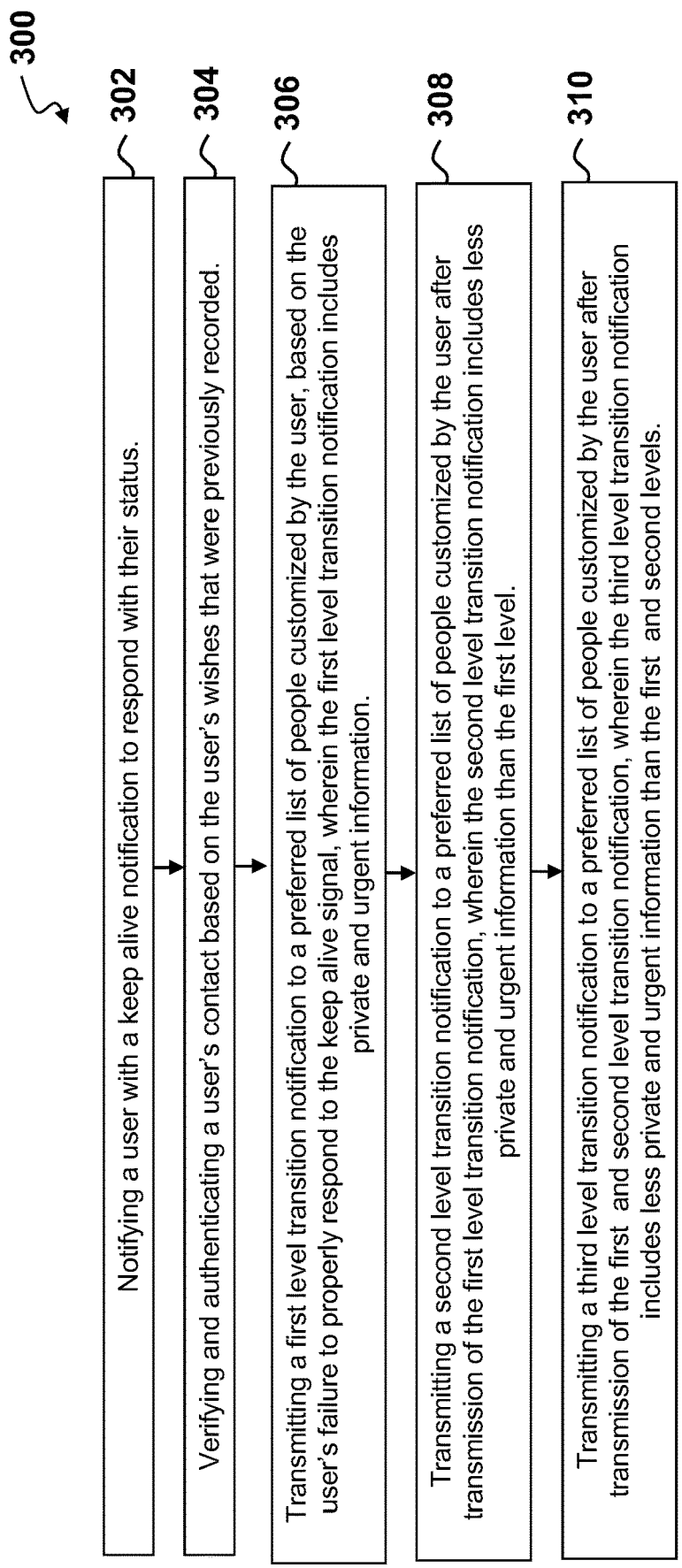
FIG. 6 depicts a flow diagram of a method of disseminating a user's customized preferred transition and notification protocol.

With respect to FIG. 6, a flow diagram of a method 300 of disseminating a user's customized preferred transition and notification protocol (TANP) is illustrated. In one embodiment, successors may be notified in the event that the user has passed away or has not responded to a notification. The notification may include a user's customized preferred transition and notification protocol (TANP) in the event of an emergency or passing. At step 302, the user receives frequent keep-alive notifications to check in and monitor if the user has passed away or may be in an emergency situation in the event that the user has not responded. In one embodiment, the manner of notification may be customized by the user, such that user may set up how they want to receive and respond to the notification. For example, the user may prefer an app on a mobile device with an alarm clock. In another embodiment, the user may prefer a proactive call in system. Other examples of notification types include biometric signatures, such as a finger print or facial recognition on a device, a voice signature, a keypad password entry, and so forth. The user may further customize the alert based on the user's pre-recorded preferences, such as the alert being less or more frequent, or to require multiple notification types.

At step 304, a user's contacts are verified and authenticated based on the user's wishes that were previously recorded. At step 306, a first level transition notification may be triggered by the user's failure to properly respond to the keep-alive notification signal (or ping) or if they have not entered the proper credentials. This notification may be transmitted to a preferred set of people designated by the user. For example, first level information that may be urgently required (including but not limited to DNR, power of attorney, an attorney's contact information, primary physician's contact information, concierge medical staff, next of kin, burial instructions, and religious preferences) may be made immediately available either to the preferred list of contacts preselected by the used, or, in some cases, made available to someone authorized to request it, such as if a hospital administrator or doctor is calling for a DNR. In one embodiment, a first level transition notification may include private and urgent information to the designated user contacts. Examples of a first level TANP may be soft copies of a will or trust, DNR, asset list, burial instructions and preferences, such as the existence of a funeral plot, key clergy, a military funeral, etc. Notifications may be disseminated to the appropriate contacts by text message, email, automated voice, and the like.

At step 308, a second level transition notification may be transmitted to the user which may include private, yet less urgent information than the first level information to the designated user contacts. Second level notifications may include documents which are identified by the user in advance, which may require additional protocols for dissemination including but not limited to a death certificate, the designated contact's ID, notarized paperwork, and in some cases a medallion signature guarantee from a bank. These documents may be available to any of the user's listed contacts with second level access. Based on the user's wishes, those on the contact list may be notified once the user's condition is known, and offer these documents based on verification and authentication. For example, the notification may alert the contact that list that the information the user asked to make available requires paperwork, such as paperwork attached in an email to the contact list that needs to be filled out before the information can be provided.

At step 310, a third level transition notification may be transmitted to the user which may include private, yet less urgent information than the first and second level information to the designated user contacts.

In one embodiment, the contact list may be different for each of the three levels. In another embodiment, the first level has the fewest and most immediate contacts. Each successive level may include additional contacts instead of or in addition to the first level contacts. As such, a user may create hierarchical access to documents, add a contact list with a given level of access, and help create authentication criteria for each level. In another embodiment, the first level has more contacts than each successive level, and each successive level may include fewer contacts than the first level contacts.

As described above, for filing and organization of documents, barcode strips may be sent to a user, such as through the physical mail or electronically. Each barcode strip may be associated with a particular document, such as a power of attorney document, a next of kin document, and the like. For physical documents, the user may attach the barcode and a mailing sticker to the corresponding document that the user has filled out and the user may send the document back for filing, storing, and/or safe keeping. In one embodiment, each document is filed based at least on the scanned barcode.

In one embodiment, a label may also be attached to the document for visually identifying the type of document, e.g., a trust, will, power of attorney, etc. The document may further include a document ID number, a client number, and a designation from the user for which level the document is to be assigned to, e.g., first, second, or third level. As the document gets scanned with the barcode, the document may then be filed and organized according to, at least, the document ID number, the client number, and the level designation. As such, the document may be integrated into the corresponding existing module.

In another embodiment, the document may be received electronically, such as via an emailed scanned version of the document or by the user uploading the document to the server. The electronic document may also include a label identifying the type of document, e.g., a trust, will, power of attorney, etc. The document may further include a document ID number, a client number, and a designation for which level the document is to be assigned to, e.g., first, second, or third level, for hierarchical access. In one embodiment, an electronic barcode may be scanned with a third party application, such as a digital barcode scanner or QR scanner. In another embodiment, the electronic document may be labeled directly by the user, such as by digital inking. In one embodiment, the digital inking may digitally represent handwriting in its natural form. In one embodiment, a digitizer may be laid under or over an LCD screen to create an electromagnetic field that can capture the movement of a special-purpose pen, or stylus, and record the movement on the LCD screen. Digital inking may allow the user to directly write the document ID number, the client number, and the designation for which level the document is to be assigned on the electronic document. In one embodiment, a user may request a change in hierarchy of a particular document, such that a document may be moved from one level to another level, such as from level one to level two, from level three to level one, and so forth.

The described technology may also be practiced in distributed computing environments where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Those skilled in the relevant art will recognize that portions of the described technology may reside on a server computer, while corresponding portions may reside on a client computer (e.g., PC, mobile computer, tablet, or smart phone). Data structures and transmission of data particular to aspects of the technology are also encompassed within the scope of the described technology.

Figure 7:
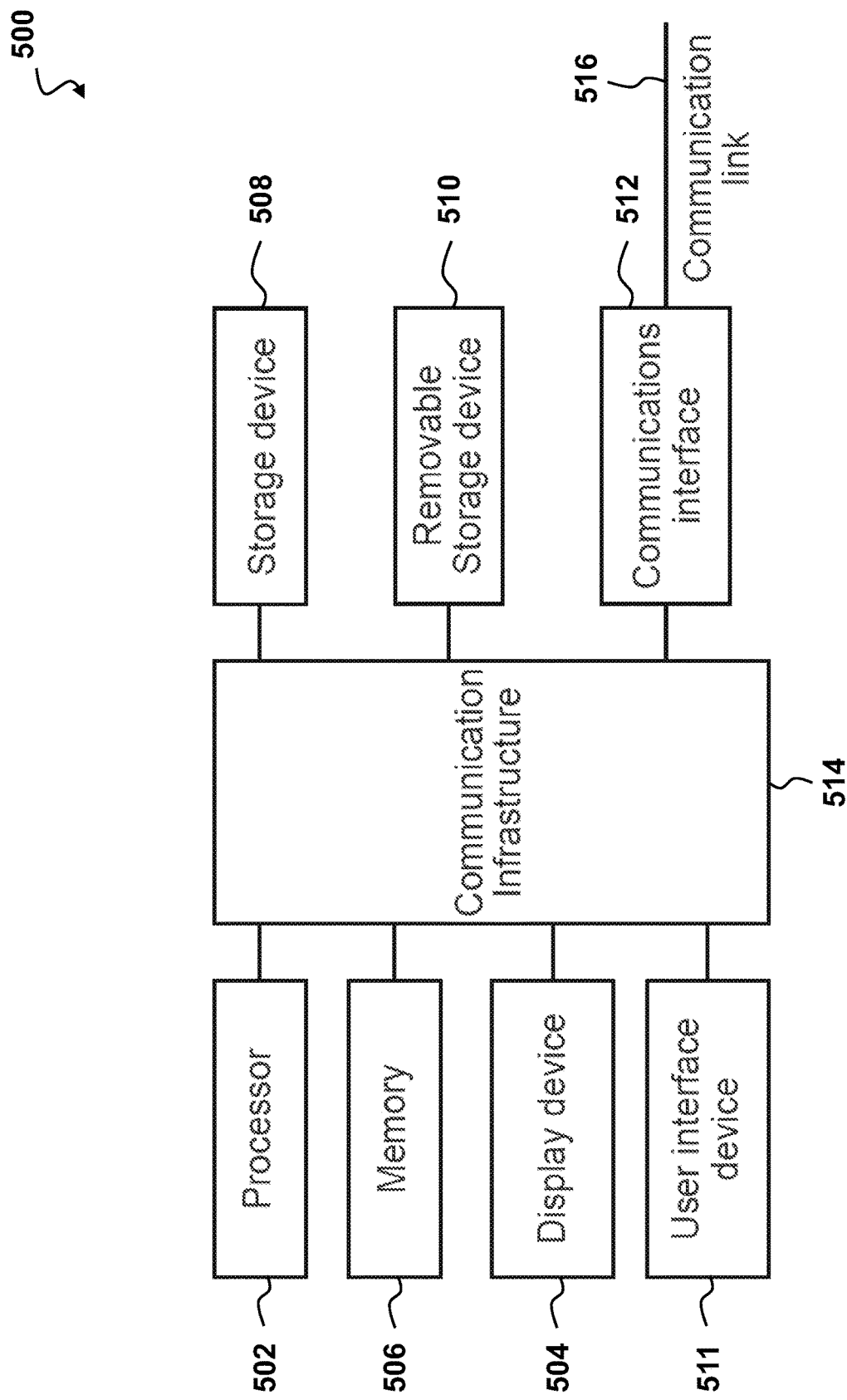
FIG. 7 shows a high-level block diagram and process of a computing system for implementing an embodiment of the system and process.

FIG. 7 is a high-level block diagram 500 showing a computing system comprising a computer system useful for implementing an embodiment of the system and process, disclosed herein. Embodiments of the system may be implemented in different computing environments. The computer system includes one or more processors 502, and can further include an electronic display device 504 (e.g., for displaying graphics, text, and other data), a main memory 506 (e.g., random access memory (RAM)), storage device 508, a removable storage device 510 (e.g., removable storage drive, a removable memory module, a magnetic tape drive, an optical disk drive, a computer readable medium having stored therein computer software and/or data), user interface device 511 (e.g., keyboard, touch screen, keypad, pointing device), and a communication interface 512 (e.g., modem, a network interface (such as an Ethernet card), a communications port, or a PCMCIA slot and card). The communication interface 512 allows software and data to be transferred between the computer system and external devices. The system further includes a communications infrastructure 514 (e.g., a communications bus, cross-over bar, or network) to which the aforementioned devices/modules are connected as shown.

Information transferred via communications interface 514 may be in the form of signals such as electronic, electromagnetic, optical, or other signals capable of being received by communications interface 514, via a communication link 516 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 512. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 8:
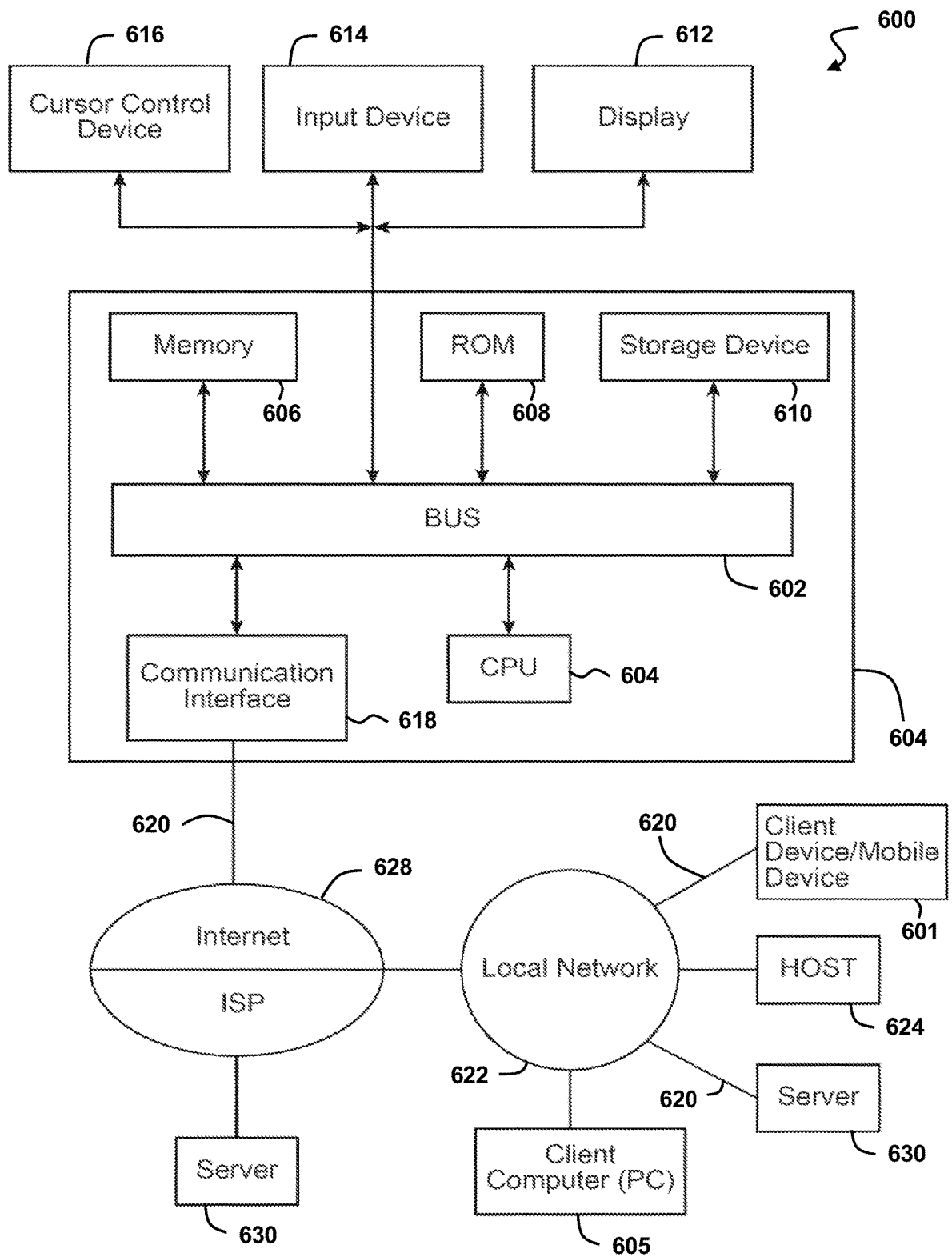
FIG. 8 shows a block diagram and process of an exemplary system in which an embodiment may be implemented.

FIG. 8 shows a block diagram of an example system 600 in which an embodiment may be implemented. The system 600 includes one or more client devices 601 such as consumer electronics devices, connected to one or more server computing systems 630. A server 630 includes a bus 602 or other communication mechanism for communicating information, and a processor (CPU) 604 coupled with the bus 602 for processing information. The server 630 also includes a main memory 606, such as a random access memory (RAM) or other dynamic storage device, coupled to the bus 602 for storing information and instructions to be executed by the processor 604. The main memory 606 also may be used for storing temporary variables or other intermediate information during execution or instructions to be executed by the processor 604. The server computer system 630 further includes a read only memory (ROM) 608 or other static storage device coupled to the bus 602 for storing static information and instructions for the processor 604. A storage device 610, such as a magnetic disk or optical disk, is provided and coupled to the bus 602 for storing information and instructions. The bus 602 may contain, for example, thirty-two address lines for addressing video memory or main memory 606. The bus 602 can also include, for example, a 32-bit data bus for transferring data between and among the components, such as the CPU 604, the main memory 606, video memory and the storage 610. Alternatively, multiplex data/address lines may be used instead of separate data and address lines.

The server 630 may be coupled via the bus 602 to a display 612 for displaying information to a computer user. An input device 614, including alphanumeric and other keys, is coupled to the bus 602 for communicating information and command selections to the processor 604. Another type or user input device comprises cursor control 616, such as a mouse, a trackball, or cursor direction keys for communicating direction information and command selections to the processor 604 and for controlling cursor movement on the display 612.

According to one embodiment, the functions are performed by the processor 604 executing one or more sequences of one or more instructions contained in the main memory 606. Such instructions may be read into the main memory 606 from another computer-readable medium, such as the storage device 610. Execution of the sequences of instructions contained in the main memory 606 causes the processor 604 to perform the process steps described herein. One or more processors in a multi-processing arrangement may also be employed to execute the sequences of instructions contained in the main memory 606. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 604 for execution. Such a medium may take many forms, including but not limited to, non-volatile media, volatile media, and transmission media. Non-volatile media includes, for example, optical or magnetic disks, such as the storage device 610. Volatile media includes dynamic memory, such as the main memory 606. Transmission media includes coaxial cables, copper wire and fiber optics, including the wires that comprise the bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 604 for execution. For example, the instructions may initially be carried on a magnetic disk of a remote computer. The remote computer can load the instructions into its dynamic memory and send the instructions over a telephone line using a modem. A modem local to the server 630 can receive the data on the telephone line and use an infrared transmitter to convert the data to an infrared signal. An infrared detector coupled to the bus 602 can receive the data carried in the infrared signal and place the data on the bus 602. The bus 602 carries the data to the main memory 606, from which the processor 604 retrieves and executes the instructions. The instructions received from the main memory 606 may optionally be stored on the storage device 610 either before or after execution by the processor 604.

The server 630 also includes a communication interface 618 coupled to the bus 602. The communication interface 618 provides a two-way data communication coupling to a network link 620 that is connected to the world wide packet data communication network now commonly referred to as the Internet 628. The Internet 628 uses electrical, electromagnetic or optical signals that carry digital data streams. The signals through the various networks and the signals on the network link 620 and through the communication interface 618, which carry the digital data to and from the server 630, are exemplary forms or carrier waves transporting the information.

In another embodiment of the server 630, interface 618 is connected to a network 622 via a communication link 620. For example, the communication interface 618 may be an integrated services digital network (ISDN) card or a modem to provide a data communication connection to a corresponding type of telephone line, which can comprise part of the network link 620. As another example, the communication interface 618 may be a local area network (LAN) card to provide a data communication connection to a compatible LAN. Wireless links may also be implemented. In any such implementation, the communication interface 618 sends and receives electrical electromagnetic or optical signals that carry digital data streams representing various types of information.

The network link 620 typically provides data communication through one or more networks to other data devices. For example, the network link 620 may provide a connection through the local network 622 to a host computer 624 or to data equipment operated by an Internet Service Provider (ISP). The ISP in turn provides data communication services through the Internet 628. The local network 622 and the Internet 628 both use electrical, electromagnetic or optical signals that carry digital data streams. The signals through the various networks and the signals on the network link 620 and through the communication interface 618, which carry the digital data to and from the server 630, are exemplary forms or carrier waves transporting the information.

The server 630 can send/receive messages and data, including e-mail, program code, through the network, the network link 620 and the communication interface 618. Further, the communication interface 618 can comprise a USB/Tuner and the network link 620 may be an antenna or cable for connecting the server 630 to a cable provider, satellite provider or other terrestrial transmission system for receiving messages, data and program code from another source.

The example versions of the embodiments described herein may be implemented as logical operations in a distributed processing system such as the system 600 including the servers 630. The logical operations of the embodiments may be implemented as a sequence of steps executing in the server 630, and as interconnected machine modules within the system 600. The implementation is a matter of choice and can depend on performance of the system 600 implementing the embodiments. As such, the logical operations constituting said example versions of the embodiments are referred to for e.g., as operations, steps or modules.

Similar to a server 630 described above, a client device 601 can include a processor, memory, storage device, display, input device and communication interface (e.g., e-mail interface) for connecting the client device to the Internet 628, the ISP, or LAN 622, for communication with the servers 630.

The system 600 can further include computers (e.g., personal computers, computing nodes) 605 operating in the same manner as client devices 601, where a user can utilize one or more computers 605 to manage data in the server 630.

Figure 9:
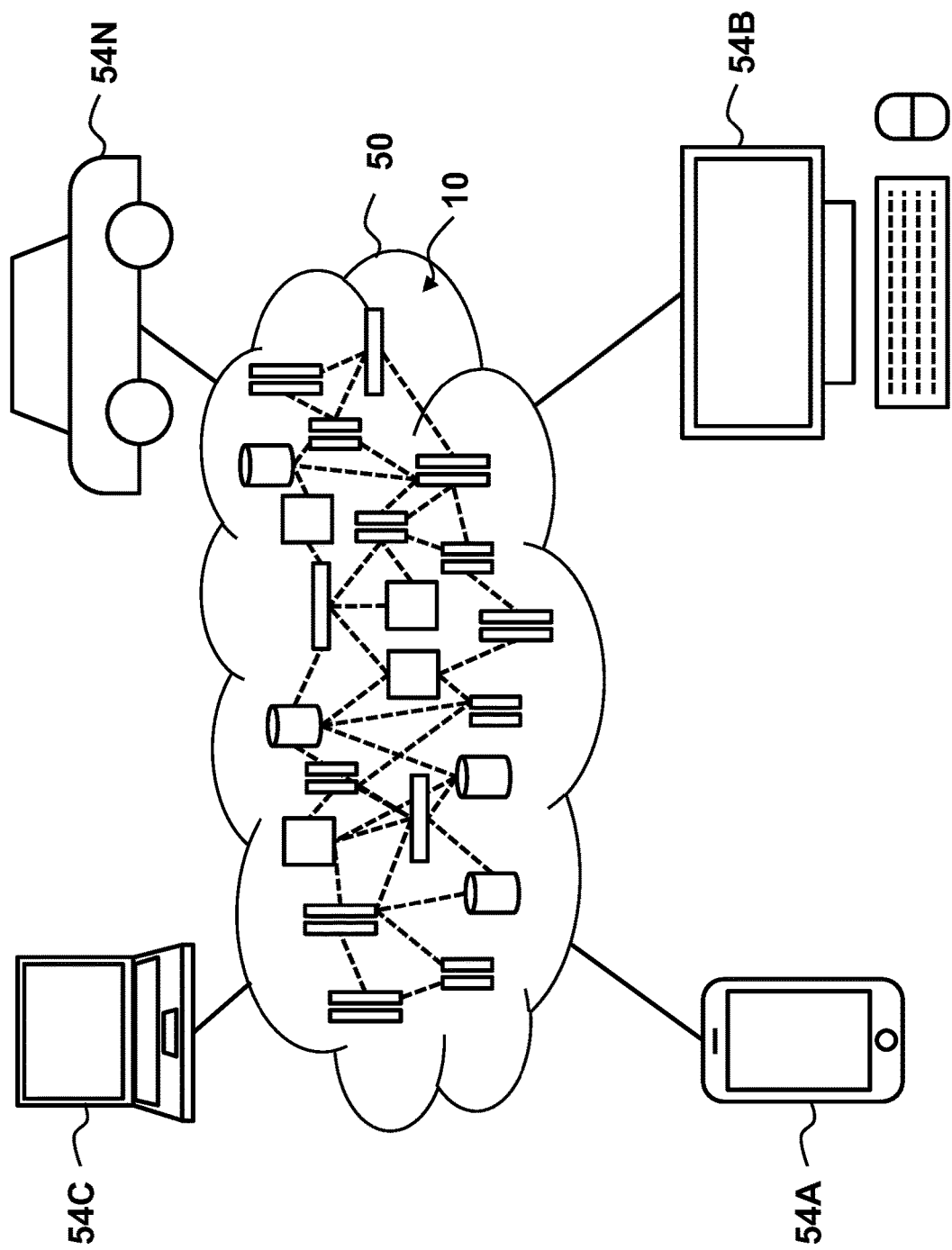
FIG. 9 depicts a cloud computing environment for implementing an embodiment of the system and process disclosed herein.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A system comprising:
    a user computing device having a processor, an addressable memory, and a user interface including input devices;
    a server computing device having a processor and an addressable memory, in communication with the user computing device;
    wherein the user computing device is configured to:
        enter, via the input devices, document data associated with a plurality of documents and a biometric signature of a user, wherein the biometric signature is at least one of a fingerprint, a face, a voice signature, and a keypad password;
        create, via the processor, a plurality of contact lists and a plurality of access levels associated with the documents for each of the contact lists, respectively;
        receive, via the user computing device, a set of barcodes transmitted from the server computing device of the system, wherein each barcode of the set of received barcodes is associated with each of the document data;
        associate the received barcodes with the entered document data, respectively; and
        scan, via the input devices, the attached barcodes to organize the document data according to designation of the access levels of the contact list; and
    wherein the server processor is configured to:
        transmit a keep-alive signal to the user computing device at a predefined interval;
        receive a reply with the biometric signature from the user computing device in response to the transmitted keep-alive signal;
        authenticate the received reply to determine whether the reply is from the user by using at least one of a fingerprint recognition, a facial recognition, a voice recognition, and a password recognition, and determine whether the user is in an active status or a non-active status based on whether the reply to the keep-alive signal is received prior to an expiration of the predefined interval;
        transmit a first level transition notification including at least one of the entered documents in a first access level of the plurality of access levels to a first contact list of the plurality of contact lists of the user if the determined status of the user is non-active;
        transmit a second level transition notification including at least one of the entered documents in a second access level of the plurality of access levels to a second contact list of the plurality of contact lists of the user after a first time period has expired and the reply to the keep-alive signal is not received;
        transmit a third level transition notification including at least one of the entered documents in a third access level of the plurality of access levels to a third contact list of the plurality of contact lists of the user after a second time period has expired and the reply to the keep-alive signal is not received; and
        wherein a hierarchical access to documents is created thereby adding a contact list with a given level of access determines authentication criteria for each level.

2. The system of claim 1, wherein the first contact list has more access to the user information than the second contact list.

3. The system of claim 2, wherein the second contact list has more access to the user information than the third contact list.

4. The system of claim 1, wherein the first contact list comprises more members than the second contact list.

5. The system of claim 4, wherein the second contact list comprises more members than the third contact list.

6. The system of claim 1, wherein the first contact list comprises fewer members than the second contact list.

7. The system of claim 6, wherein the second contact list comprises fewer members than the third contact list.

8. The system of claim 1, wherein the first level transition notification further comprises:
    one or more copies of a will or trust;
    do not resuscitate forms;
    an asset list; and
    burial instructions and preferences.

9. The system of claim 8, wherein the second level transition notification further comprises:
    a death certificate;
    a designated contact's identification (ID); and
    one or more notarized paperwork.

10. The system of claim 9, wherein the third level transition notification further comprises:
    one or more digital account passwords; and
    banking information.

11. A method comprising:
    entering, via an input interface of a user computing device of a system, document data associated with a plurality of documents and a biometric signature of a user, wherein the biometric signature is at least one of a fingerprint, a face, a voice signature, and a keypad password;
    creating, via a processor of the user computing device, a first contact list, a second contact list, and a third contact list each associated with a first access level, a second access level, and a third access level to the documents for each of the contact lists, respectively;
    receiving, at least one of via the processor and physically, barcodes transmitted from a server computing device of the system, wherein each of the barcodes is associated with each of the entered documents, and the system is configured to allow the received barcodes to be attached on the entered documents, respectively;
    scanning, via a user interface of the user computing device, the attached barcodes to organize the entered documents according to designation of the access levels of the entered documents;

receiving, by a server computing device having a processor and addressable memory, a reply including the biometric signature from the user in response to the keep-alive signal via the input interface of the user computing device, authenticating, by the processor of the server computing device, to determine whether the reply is from the user by using at least one of fingerprint recognition, a facial recognition, a voice recognition, and a password recognition and determining an active status or a non-active status of the user based on whether the reply to the keep-alive signal is received prior to an expiration of the predefined interval;

transmitting, by the server computing device, a first level transition notification including at least one of the documents in the first access level of the plurality of access levels to a first contact list of the plurality of contact lists of the user if the determined status of the user is non-active;

transmitting, by the server computing device, a second level transition notification including at least one of the documents in the second access level of the plurality of access levels to a second contact list of the plurality of contact lists of the user after a first time period has expired and the reply to the keep-alive signal is not received; and transmitting, by the server computing device, a third level transition notification including at least one of the documents in the third access level of the plurality of access levels to a third contact list of the plurality of contact lists of the user after a second time period has expired and the reply to the keep-alive signal is not received; and wherein a hierarchical access to documents is created thereby adding a contact list with a given level of access determines authentication criteria for each level.

12. The method of claim 11, wherein the first level transition notification further comprises:
one or more copies of a will or trust;
do not resuscitate forms;
an asset list; and
one or more burial instructions and preferences.

13. The method of claim 12, wherein the second level transition notification further comprises:
a death certificate;
a designated contact's identification (ID); and
one or more notarized paperwork.

14. The method of claim 13, wherein the third level transition notification further comprises:
one or more digital account passwords; and
banking information.

15. The method of claim 11, wherein the first contact list has more access to the user information than the second contact list.

16. The method of claim 15, wherein the second contact list has more access to the user information than the third contact list.

17. The system of claim 1, wherein the user computing device is further configured to:
reply, via the input devices, to a keep-alive signal transmitted from the server computing device, with the biometric signature.

18. The method of claim 11 further comprising:
transmitting, by the server computing device, a keep-alive signal to a user at a predefined interval.

* * * * *